United States Patent
Teraoka

(10) Patent No.: US 8,276,855 B2
(45) Date of Patent: Oct. 2, 2012

(54) SOLDERING IRON STAND

(75) Inventor: Yoshitomo Teraoka, Osaka (JP)

(73) Assignee: Hakko Corporation, Osaka (JP)

( * ) Notice: Subject to any disclaimer, the term of this patent is extended or adjusted under 35 U.S.C. 154(b) by 383 days.

(21) Appl. No.: 12/611,100

(22) Filed: Nov. 2, 2009

(65) Prior Publication Data

US 2010/0108827 A1    May 6, 2010

Related U.S. Application Data

(60) Provisional application No. 61/110,503, filed on Oct. 31, 2008.

(30) Foreign Application Priority Data

Oct. 31, 2008   (JP) ................................ 2008-280823

(51) Int. Cl.
    *D06F 5/00*    (2006.01)
(52) U.S. Cl. ................... 248/117.2; 248/176.2; 248/314
(58) Field of Classification Search .... 248/117.1–117.7, 248/314, 315; 118/265; 15/104.92, 229.13; 126/236; 219/242, 230; 228/19, 57
    See application file for complete search history.

(56) References Cited

U.S. PATENT DOCUMENTS

| | | | |
|---|---|---|---|
| 3,609,791 A | 10/1971 | Siegel et al. | |
| 3,705,680 A | 12/1972 | Siegel | |
| 3,990,623 A | 11/1976 | Fortune | |
| 4,355,726 A * | 10/1982 | Mutschler | 211/69.5 |
| 4,456,816 A | 6/1984 | Fortune | |
| 4,662,022 A | 5/1987 | Vogler | |
| 4,999,480 A | 3/1991 | Smith | |
| 6,123,299 A * | 9/2000 | Zach, Sr. | 248/117.1 |
| 6,585,210 B1 * | 7/2003 | Lee | 248/314 |
| 2004/0129133 A1 * | 7/2004 | Kiikka | 92/175 |

FOREIGN PATENT DOCUMENTS

JP    P2005-111496 A    4/2005

* cited by examiner

*Primary Examiner* — Gwendolyn W Baxter

(74) *Attorney, Agent, or Firm* — Squire Sanders (US) LLP

(57) ABSTRACT

A soldering iron stand comprises a stand base, and a soldering iron holder provided on an upper portion of the stand base and formed to have a curved surface for receiving thereon a soldering iron to be held by the stand base. The soldering iron holder has a plurality of recesses formed therein and arranged in a circumferential direction of the curved surface. Each of the recesses is provided with a heat-resistant elastic member.

14 Claims, 10 Drawing Sheets

US 8,276,855 B2

SOLDERING IRON STAND

CROSS-REFERENCE TO RELATED APPLICATION

This application claims the benefit of U.S. Provisional Application No. 61/110,503, filed Oct. 31, 2008, which is incorporated herein by reference in its entirety. This application claims foreign priority to Japanese Application No. P2008-280823, filed Oct. 31, 2008, which is incorporated herein by reference in its entirety.

BACKGROUND OF THE INVENTION

1. Field of the Invention

This invention relates generally to a soldering iron stand.

2. Description of the State of the Art

Soldering techniques are a cornerstone of the electric and electronic industries, and technological advances therein have been amazing.

Along with industrial growth, soldering for a large number of electric/electronic circuit boards has been increasingly dominated by soldering using an automatic machine free of human power, i.e., a flow-soldering bath and a reflow-soldering furnace. However, there inherently remains a manual soldering task using a soldering iron, such as a soldering task for repair, and a soldering task for a particular electronic element which cannot be soldered without relying on human power.

In manual soldering operations, a soldering iron stand is used for putting a soldering iron thereon when the operator does not use the soldering iron.

As disclosed in Japanese Patent Unexamined Publication P2005-111496A (hereinafter referred to as "Prior Art Document 1"), a soldering iron stand is provided with a sleeve-shaped soldering iron holder for receiving therein a soldering iron. An operator inserts the soldering iron, into the soldering iron holder from a tip end of the soldering iron, to put the soldering iron on the soldering iron stand.

In manual soldering operations, operators often repeat operations of putting soldering irons on soldering iron stands. Because a soldering iron holder provided with the soldering iron stand is a member which holds a heated portion of the soldering iron, the member is generally made of metal having high heat resistance. Thus, in many times, uncomfortable metallic sound occurs when a soldering iron is put on the soldering holder during the use of the conventional soldering iron stand disclosed in the Prior Art Document 1 due to the friction between the soldering iron and the soldering iron holder.

One contemplated way to solve this problem is to choose a plastic material having high heat resistance for the soldering iron holder in the Prior Art Document 1. In this case, however, heat is liable to accumulate in a grip portion of the soldering iron. This causes a new problem that a temperature management becomes difficult.

Accordingly, there is a need to provide a soldering iron stand capable of preventing the occurrence of noise and maximally reducing a heat influence on a grip portion of a soldering iron.

SUMMARY OF THE INVENTION

Briefly and in general terms, the present invention is directed to a soldering iron stand.

In some aspects of the present invention, a soldering iron stand comprises a stand base and a soldering iron holder. The soldering iron holder is on an upper portion of the stand base. The soldering iron holder includes a curved surface configured to receive and support a soldering iron. The soldering iron holder has a plurality of recesses formed therein and arranged in a circumferential direction of the curved surface, each of the recesses being provided with a heat-resistant elastic member.

In some aspects of the present invention, a soldering iron stand comprises a stand base and a soldering iron holder on the stand base, the soldering iron holder including a central passageway, an inner metal sleeve enclosing the central passageway, and a vibration dampening member of elastic material compressed against inner the metal sleeve.

The features and advantages of the invention will be more readily understood from the following detailed description which should be read in conjunction with the accompanying drawings.

BRIEF DESCRIPTION OF THE DRAWINGS

FIGS. 2A and 2B are appearance diagrams of the soldering iron stand, wherein FIG. 2A is a top plan view, and FIG. 2B is a side view.

FIGS. 5A and 5B are sectional views of the soldering iron stand, wherein FIG. 5A illustrates a state in a course of releasing a residue receiver set in an attaching position, and FIG. 5B illustrates a state after releasing the residue receiver, as one example of a releasing position of the residue receiver.

FIGS. 6A and 6B are perspective views of a soldering iron holder in the soldering iron stand illustrated in FIG. 1, wherein FIG. 6A is an overall perspective view showing an external appearance thereof, and FIG. 6B is a partially-broken perspective view.

DETAILED DESCRIPTION OF THE INVENTION

Figure 1:
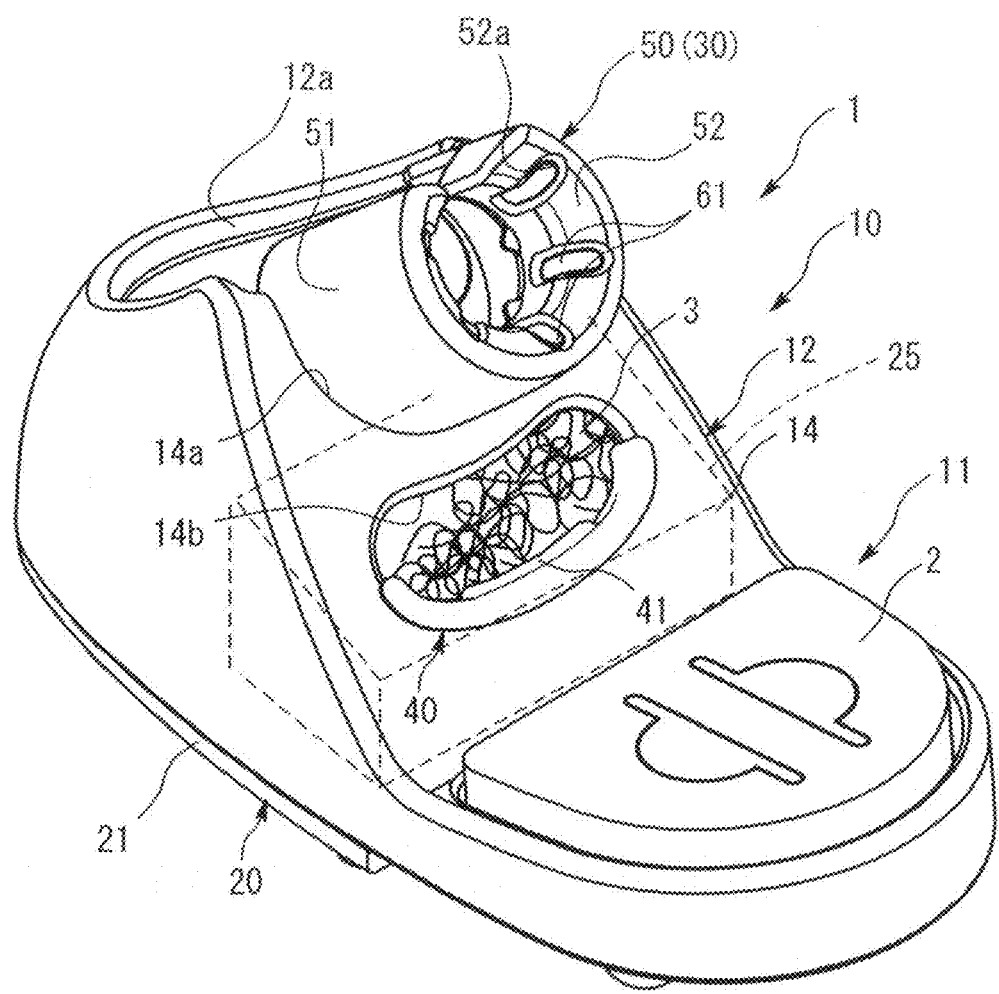
FIG. 1 is a perspective view showing an external appearance of a soldering iron stand according to one embodiment of the present invention.

According to an embodiment of the present invention, a soldering iron stand comprising a stand base and a soldering iron holder. The soldering iron holder is provided on an upper portion of the stand base, and formed to have a curved surface for receiving thereon a soldering iron to be held by the stand base. The soldering iron holder has a plurality of recesses or cavities formed therein and arranged in a circumferential direction of the curved surface, each of the recesses being provided with a heat-resistant elastic member.

The soldering iron comes into slide contact with the curved surface of the soldering iron holder when the soldering iron is inserted into the soldering iron holder to put the soldering iron on the stand. The vibration of the soldering iron holder which would occurs when the soldering iron is inserting will be absorbed and/or dampened by the heat-resistant elastic member. This prevents the noise which would otherwise be made in a conventional soldering iron stand. Heat in a grip portion of the soldering iron put on the stand is transferred to the soldering iron holder and released into the atmosphere. The "curved surface" may be in the form of a sleeve-shaped member having a cylindrical shape or a C shape in cross-section.

In a further embodiment, each of the elastic members is press-fitted in a respective one of the recesses in such a manner as to be flush with the curved surface or slightly sunken radially outwards relative to the curved surface. This allows the soldering iron to come into direct contact with the soldering iron holder during putting the soldering iron into a sleeve body of the soldering iron holder, so that the heat release effect can be enhanced. Preferably, a depth of the sunken space ("d" in FIG. 8) is set, for example, in the range of 0 mm to 1 mm.

In another embodiment, the soldering iron holder is a metal sleeve body including an outer sleeve, having a base end adapted to be fixed to the stand base, and an inner sleeve, disposed along and in concentric relation to the outer sleeve. The inner sleeve has a peripheral wall serving as the curved surface with a plurality of slits serving as the recesses. The elastic members comprise heat-resistant plastics, interposed between the inner and the outer sleeves of the metal sleeve body, and a plurality of first protrusions, each of which is integrally molded on the heat-resistant plastics, and press-fitted in a respective one of the slits. The elastic members may be integrally molded together with the heat-resistant plastics as a single member.

This makes it possible to facilitate handling, such as assembling, and increase a contact area of the heat-resistant plastics with respect to the inner sleeve, based, on the first protrusions press-fitted in respective ones of the slits serving as the plurality of recesses, to improve the vibration absorbability and consequently obtain enhanced noise reduction effect.

In yet another embodiment, the heat-resistant plastics has a plurality of second protrusions, on a radially inside peripheral surface thereof, which are arranged between respective adjacent ones of the first protrusions in circumferentially spaced-apart relation to each other, and are pressed against a radially outside peripheral surface of the inner sleeve. The second protrusions and the first protrusions press-fitted in the recesses, are circumferentially arranged in a staggered pattern to form a support structure for the inner sleeve. This makes it possible to obtain more enhanced vibration absorbability or noise reduction effect, and strengthen a fixation structure.

In still another embodiment, the soldering iron holder is adapted to be detachably fixed to the stand base. This makes it possible to facilitate maintenance operations for the soldering iron holder and the stand base.

In yet still another embodiment, the stand base includes: a surrounding section adapted to surround the heated portion of the soldering iron in the state of being inserted into the soldering iron holder; a residue receiver, provided at a bottom of the surrounding section, and adapted to receive solder residue which is, likely to drop from the soldering tip of the soldering iron in the state of being inserted into the soldering iron holder; an attaching mechanism adapted to allow the residue receiver to be attached to the surrounding section in such a manner as to be displaceable between an attaching position where the residue receiver is attached to the surrounding section to collect the solder residue and a releasing position where the residue receiver is released from the surrounding section so as to allow to dispose the collected solder residue; and a locking mechanism adapted to lock the residue receiver set in the attaching position; and an unlocking button which release the locked state of the residue receiver by a push operation. Preferably, the locking mechanism may be embodied by joining a lock hook to a locking projection.

The heated portion of the soldering iron in the state of being inserted into the soldering iron holder is surrounded by the surrounding section of the stand base. This makes it possible to put the soldering iron on the soldering iron stand ensuring operator's safety.

Solder residue may drop from the soldering tip of the soldering iron. Solder residue on the soldering tip may also be enlarged into a solder ball which is likely to burst within the soldering iron stand. In these cases, the solder residue is collected by the residue receiver, attached to the attaching position, without scattering around the soldering iron stand. Based on the attaching mechanism, the residue receiver is adapted to be displaceable between the attaching position where the residue receiver is integrally put to the surrounding section to serve as a bottom of the surrounding section, and the releasing position where the residue receiver is released from the surrounding section so as to allow to displace only the residue receiver for disposal of the collected solder residue. Thus, the residue receiver can be attached to the surrounding section to collect solder residue in the above manner, and is released from the surrounding section to allow the collected solder residue to be readily discarded without being spilled on a work bench and a floor. A posture of the residue receiver set in the attaching position is locked by the locking mechanism which may be provided with the hook. Thus, during the use of the soldering iron of the soldering iron stand, the residue receiver is kept from opening suddenly the bottom of the surrounding section. Further, the locked state of the residue receiver is released by pushing the unlocking button. This makes it possible to facilitate the operation of releasing the residue receiver.

In another further preferred embodiment, the stand base includes: a metal wool container storing therein a thin strip-shaped metal wool capable of cleaning the soldering tip of the soldering iron; a cleaning window allowing the thin strip-shaped metal wool stored in the metal wool container to be exposed therethrough; and a pad attached to a lower edge of the cleaning window. The pad is made of a heat-resistant plastic material and formed to have a scraping portion extending along the lower edge of the cleaning window.

An operator can insert the soldering tip of the soldering iron into the metal wool container through the cleaning window to efficiently clean the soldering tip using the strip-shaped metal wool in the container. During this operation, the soldering tip can be scraped by the scraping portion provided along the lower edge of the cleaning window to further efficiently scrape off solder residue upon the soldering tip. In the above aspect, the scraping portion is preferably a raised region extending along the lower edge of the cleaning window. The raised region may be formed in various shapes, such as a linear shape, a curved shape, a wave shape, and, in cross-section, a triangular shape.

As described above, in the present invention, vibration which would occur during the operation of putting the soldering iron on the stand base will be absorbed and/or dampened by the heat-resistant elastic members, and the heat in the grip portion of the soldering iron put on the stand is transferred to the soldering iron holder and released. This provides a significant advantage of being able to prevent the occurrence of abnormal noise which would otherwise arise in a conventional soldering iron stand, and maximally reduce a heat influence on the grip portion of the soldering iron.

Referring now in more detail to the exemplary drawings for purposes of illustrating embodiments of the invention, wherein like reference numerals designate corresponding or like elements among the several views, there is shown in FIGS. 1 to 5A, a soldering iron stand 1 provided with a stand base 10, which is made of metal such as aluminum or aluminum alloy, and is formed, for example, by die-casting. The soldering tip K1 of a soldering iron K (see FIG. 9) happens to be heated up to a temperature of 400 degrees Centigrade or more during the use of the soldering iron. Therefore, aluminum or aluminum alloy having high heat conductivity will be most preferable as a safe and strong material of the stand base 10.

The stand base 10 includes a tray section 11, in a front end thereof; a surrounding section 12, provided on a rear side thereof in continuous relation to the tray section 11, and formed in a chevron shape in side view; and a residue receiver 20, adapted to selectively open and close a bottom of the surrounding section 12.

The tray section 11 is a dish-shaped region adapted to house a sponge 2 for cleaning the soldering tip K1 of the soldering iron K.

The tray section 11 is also provided with a sponge mount 11a protruding upwardly from a bottom wall thereof in a star-shaped pattern. The sponge 2 formed as a porous heat-resistant material is placed on the sponge mount 11a, so that a space for reserving water is defined underneath the sponge 2. The sponge mount 11a is not limited to a star-shape type, but may employ any other suitable shape.

The surrounding section 12 is a region adapted to surround a heated portion of the soldering iron in a state of being inserted into an soldering iron holder mentioned below.

Late years, a manual soldering task has been performed by well-trained operators. However, in connection with a change in solder material for meeting the lead-free requirement, an unexpected trouble could occur even in a soldering task by such well-trained operators. Specifically, the lead-free solder material is liable to scatter the solder residue when bursting of a solder ball is occurred by heating of a flux. In order to prevent a scattering of solder residue during the use of the soldering iron K, inserted in, and put on the soldering iron stand 1, the surrounding section of this embodiment configures a relatively large height dimension to increase a housing space for the soldering iron K. This allows the soldering tip K1 of the soldering iron K to face a bottom of the housing space as close as possible to ensure a heat-releasing space and an anti-scattering effect.

The surrounding section 12 is formed to have a hollow space; the upper portion thereof is formed with a heat-releasing opening 12a.

The surrounding section 12 also has an inclined front wall 14 which is provided on a front side thereof in such a manner that a lower edge of the inclined front wall is continuously connected to a rear portion of the tray section 11. The inclined front wall 14 has a depressed portion 14a for receiving therein a soldering iron holder 30, and a cleaning window 14b, formed in the inclined front wall 14 in lengthwise alignment relation with the depressed portion 14a in an upward-downward direction.

Figure 2A:
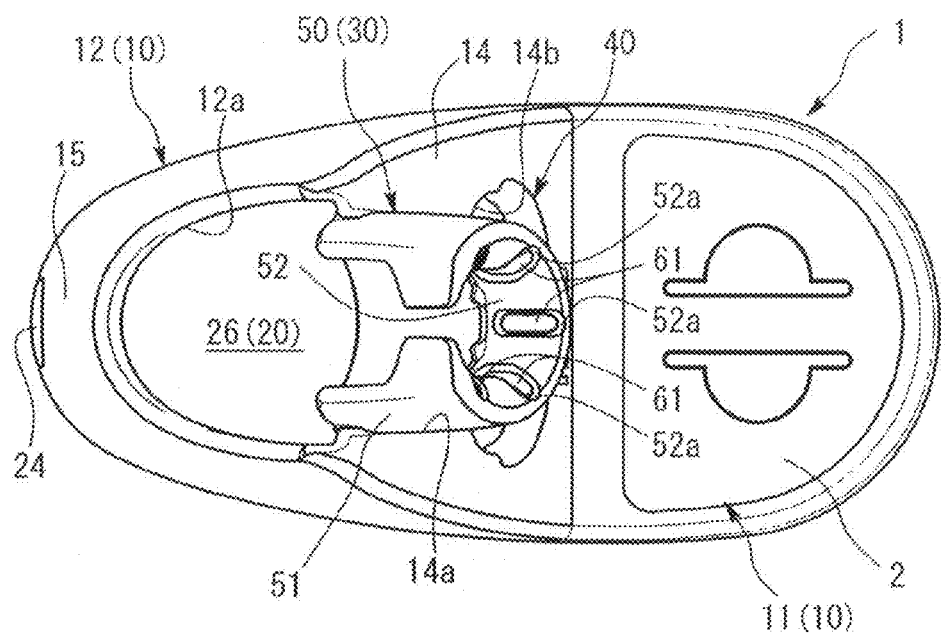
Figure 2B:
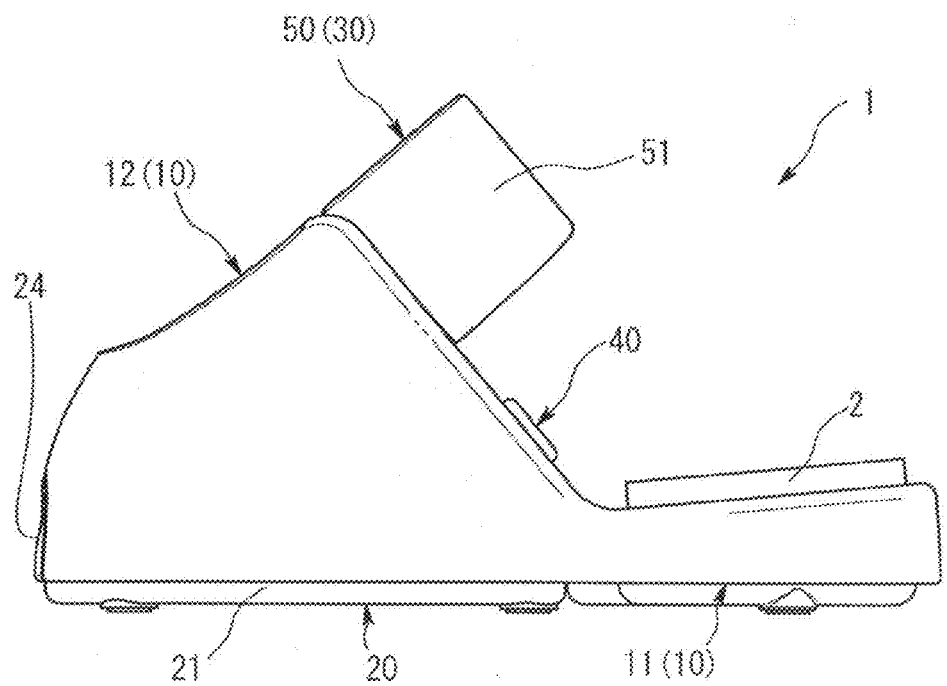
Figure 3:
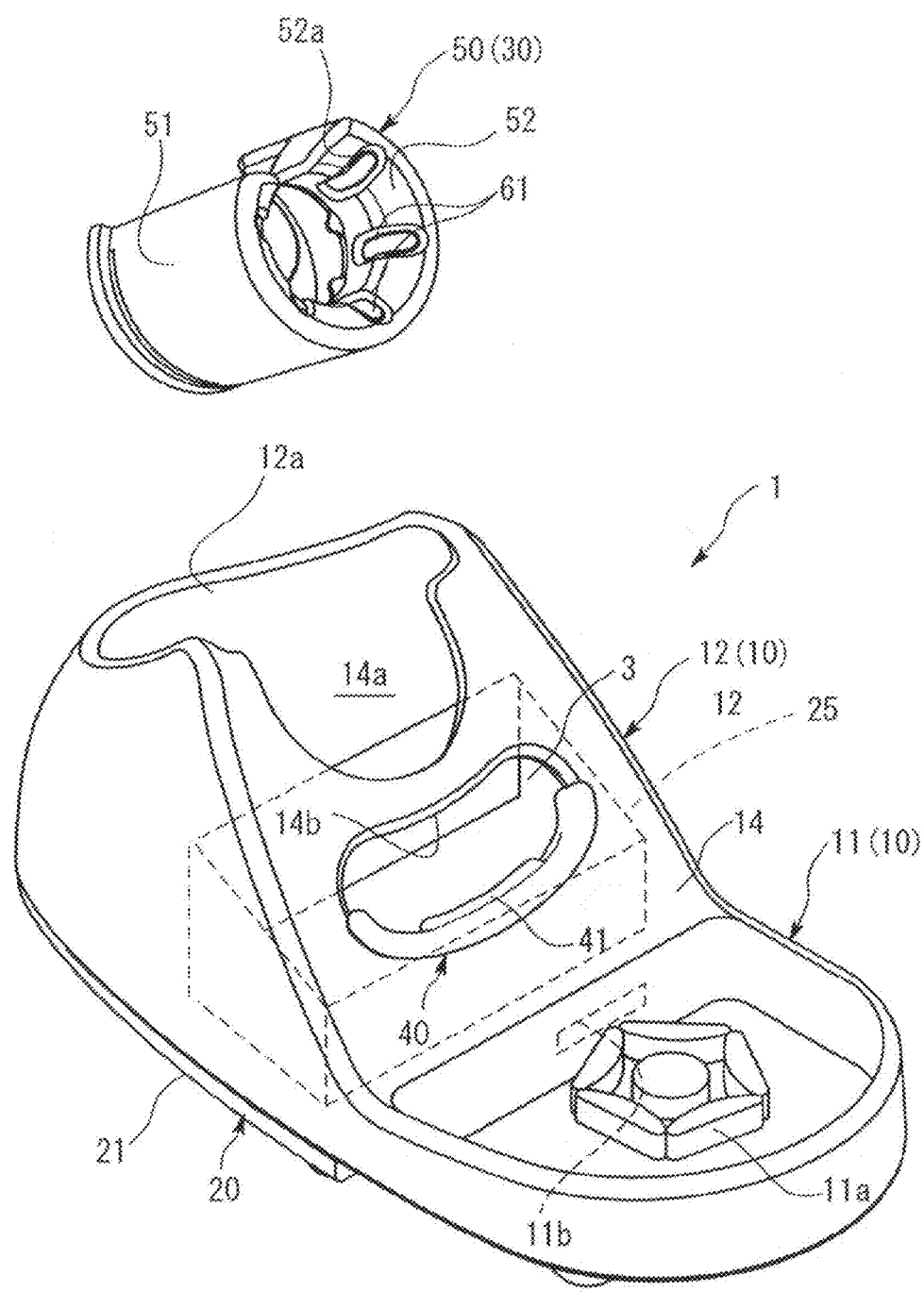
FIG. 3 is an exploded perspective view of the soldering iron stand.

As shown in FIGS. 1, 2A and 3, the soldering iron holder 30 is cylindrical in shape and has a central passageway through which a soldering iron tip K1 may pass through. The central passageway is enclosed by an inner metal sleeve 52. A slot opening on the soldering iron holder 30 extends axially parallel to and communicates with the central passageway.

Figure 5A:
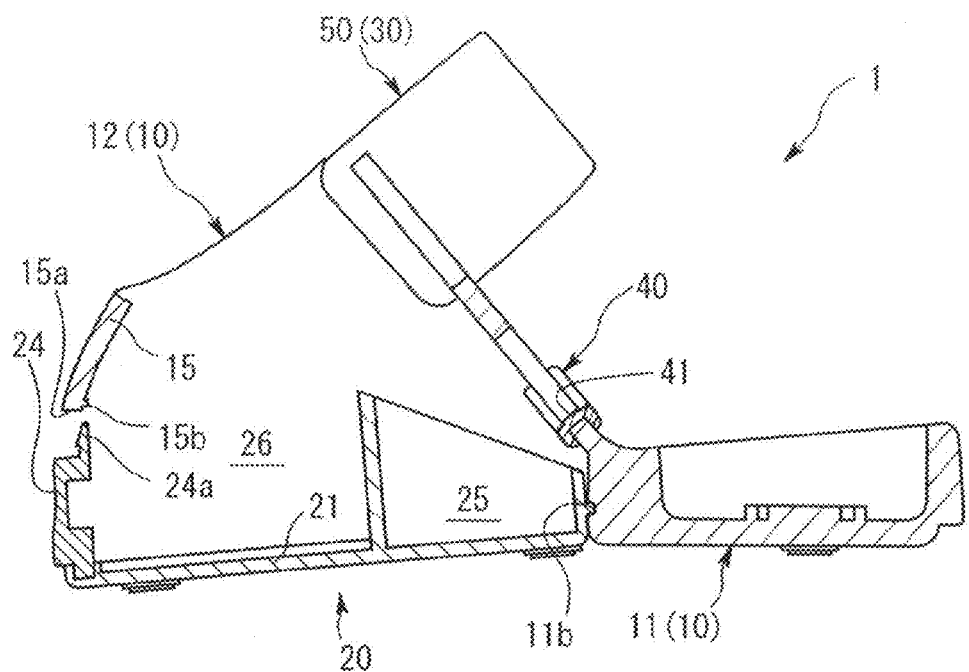
Figure 5B:
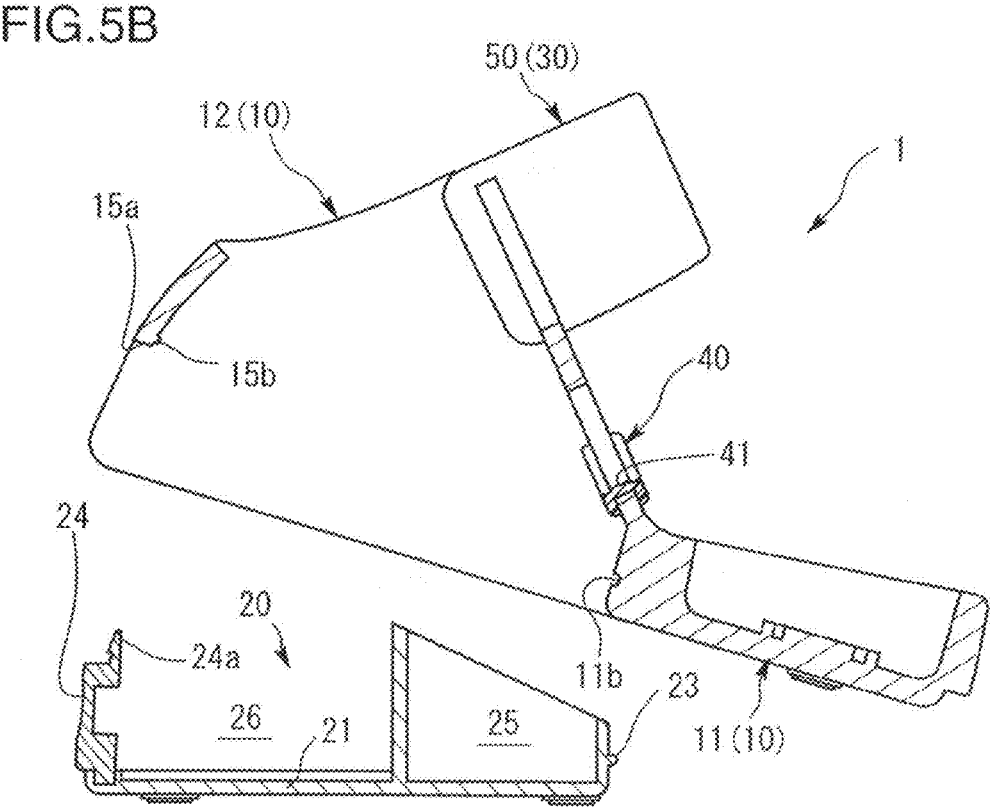

Referring to FIGS. 3, 5A and 5B, the residue receiver 20, adapted to serve as the bottom of the surrounding section 12, comprises a base plate 21. In this embodiment, the base plate 21 is adapted to define the housing space in cooperation with the surrounding section 12.

The base plate 21 has, in the cross-sectional view of FIGS. 5A and 5B, a semicircular-shaped rib 23 formed on a front end flange thereof to extend in a widthwise (lateral) direction thereof.

Correspondingly, the tray section has, in the cross-sectional view, a semicircular-shaped depression 11b formed in a rear end wall thereof to allow the rib 23 to be fitted therein. Accordingly, through operations of engaging rib 23 with the depression 11b, the residue receiver 20 can be taken between an attaching position (see FIGS. 2A and 2B) where the residue receiver 20 is attached to the surrounding section 12, and a releasing position (see FIG. 5B) where the residue receiver 20 is opened at the bottom of the surrounding section 12.

As used herein, the term "rib" refers to any length of elongated elevation running on an object. In FIG. 5B, the rib 23 is an elongated elevated or raised region formed on the front end flange of the base plate 21 to linearly extend in the lateral direction of the base plate.

In order to retain and to secure the residue receiver 20 in the attaching position relative to the surrounding section 12, a locking mechanism is provided, which comprises an unlocking button 24, a locking hook 24a and a locking projection 15b. The residue receiver 20 has an unlocking button 24 on a central region of a rear end flange of the base plate 21 thereof, and further has a locking hook 24a formed on an upper end of the unlocking button in an elastically deformable manner. Correspondingly, the surrounding section 12 has a cutout 15a, which is formed in a lower portion of a rear wall 15 thereof, in such a manner as to allow the unlocking button 24 of the residue receiver 20 set in the attaching position to be fitted thereinto; and has a locking projection 15b, which is formed on an inner surface of the rear wall 15 at an appropriate position just above the cutout 15a, in such a manner as to allow the locking hook 24a of the unlocking button 24 fitted in the cutout 15a to be tightly engaged therewith from a front side of the inner surface. This structure allows the locking hook 24a of the unlocking button 24 to be locked, in the attaching position, on the inner surface of the rear wall 15 at a position just above the locking projection 15b; so that the residue receiver 20 is kept in a fixed state relative to the surrounding section 12. From this state, when the unlocking button 24 fitted in the cutout 15a is manually pushed to frontward, the locking hook 24a is also moved forwardly and thereby disengaged from the locking projection 15b, so that the residue receiver 20 can be released from the surrounding section 12, as shown in FIGS. 5A and 5B.

The residue receiver 20 includes a metal wool container 25, integrally formed on a front portion of the bottom plate 21 to serve as a container; and a collection compartment 26, formed on a rear side of the metal wool container 25. The metal wool container 25 is provided, as a means to store therein a thin strip-shaped metal wool 3, and is adapted to communicate with the cleaning window 14b formed in the inclined front wall 14 of the surrounding section 12 so as to allow the thin strip-shaped metal wool 3 to be exposed through the cleaning window 14b. Thus, an operator can insert the soldering tip K1 of the soldering iron K into the metal wool container 25 through the cleaning window 14b to remove solder residue on the soldering tip K1 using the thin strip-shaped metal wool 3. Further, in this embodiment, a pad 40 made of heat-resistant plastic materials (more preferably silicon rubber or other heat-resistant synthetic rubber, such as Viton® is provided on a lower edge of the cleaning window 14b. The pad 40 is integrally formed with a scraping portion 41 extending along the lower edge of the cleaning window 14b. In an operation of inserting the soldering iron K into the metal wool container 25 through the cleaning window 14b to clean the soldering tip K1 of the soldering iron K, an operator can also rub the soldering tip K1 with the scraping portion 41 of the pad 40 so as to scrape off solder residue from the soldering tip K1 to fully clean up the soldering tip Kl.

A collection compartment 26 is formed in the residue receiver on the rear side of the metal wool container 25 in such a manner as to be oriented toward the soldering tip K1 of the soldering iron K in a state of being put on the soldering iron holder 30. The collection compartment 26 is a region which is, when the residue receiver 20 is in the attaching position, integrally located in the surrounding section 12 to define a bottom portion of the surrounding section 12 and to collect solder residue which, when the soldering iron holder 30 is in the state of being put on, drops from the soldering tip K1 of the soldering iron K. For example, a collection vessel (not shown) may be placed on the collection compartment 26.

The soldering iron holder 30 will be specifically described below.

As shown in FIGS. 3 and 5A to 9, the soldering iron holder 30 in the soldering iron stand 1 in accordance with this preferable embodiment is partially cut out in an axial direction thereof to have a configuration capable of enhancing a capability to release heat of the soldering iron K in a state of being held thereby. The soldering iron holder 30 is embodied using a sleeve body 50 made of metal having high heat conductivity, such as aluminum or aluminum alloy, and formed, for example, by die-casting. The sleeve body 50 comprises an outer sleeve 51 and an inner sleeve 52 which are integrally formed together.

The outer sleeve 51 has a positioning flange 51a, formed on a radially outside peripheral region of a base end thereof; and a peripheral groove 51b, formed in the radially outside peripheral region at a position frontward of the positioning flange 51a. The peripheral groove 51b is adapted to be fitted on the depressed portion 14a of the inclined front wall 14 to allow the outer sleeve 51 to be detachably mounted in the surrounding section 12. In the fixed state, the outer sleeve 51 has a posture obliquely protruding from the depressed portion 14a in a frontward direction approximately perpendicular to the inclined front wall 14.

The inner sleeve 52 is integrally molded together with the outer sleeve 51 in such a manner that it extends from a free end of the outer sleeve 51 toward an inner peripheral surface of the outer sleeve 51 in a folded manner. More specifically, the inner sleeve 52 is continuously connected to the outer sleeve 51 and disposed in concentric relation to the outer sleeve 51 with a given distance therebetween. Further, a portion of the inner sleeve 52 on the side of the distal end of the outer sleeve 51 is spread in a reverse taper shape. As illustrated in FIGS. 3, 4, 6a, 6b, and 8, the inner sleeve 52 has a plurality of generally oval-shaped axially-extending slits 52a formed in a peripheral wall (curved surface) thereof and arranged in circumferentially and evenly spaced-apart relation to each other.

Figure 9:
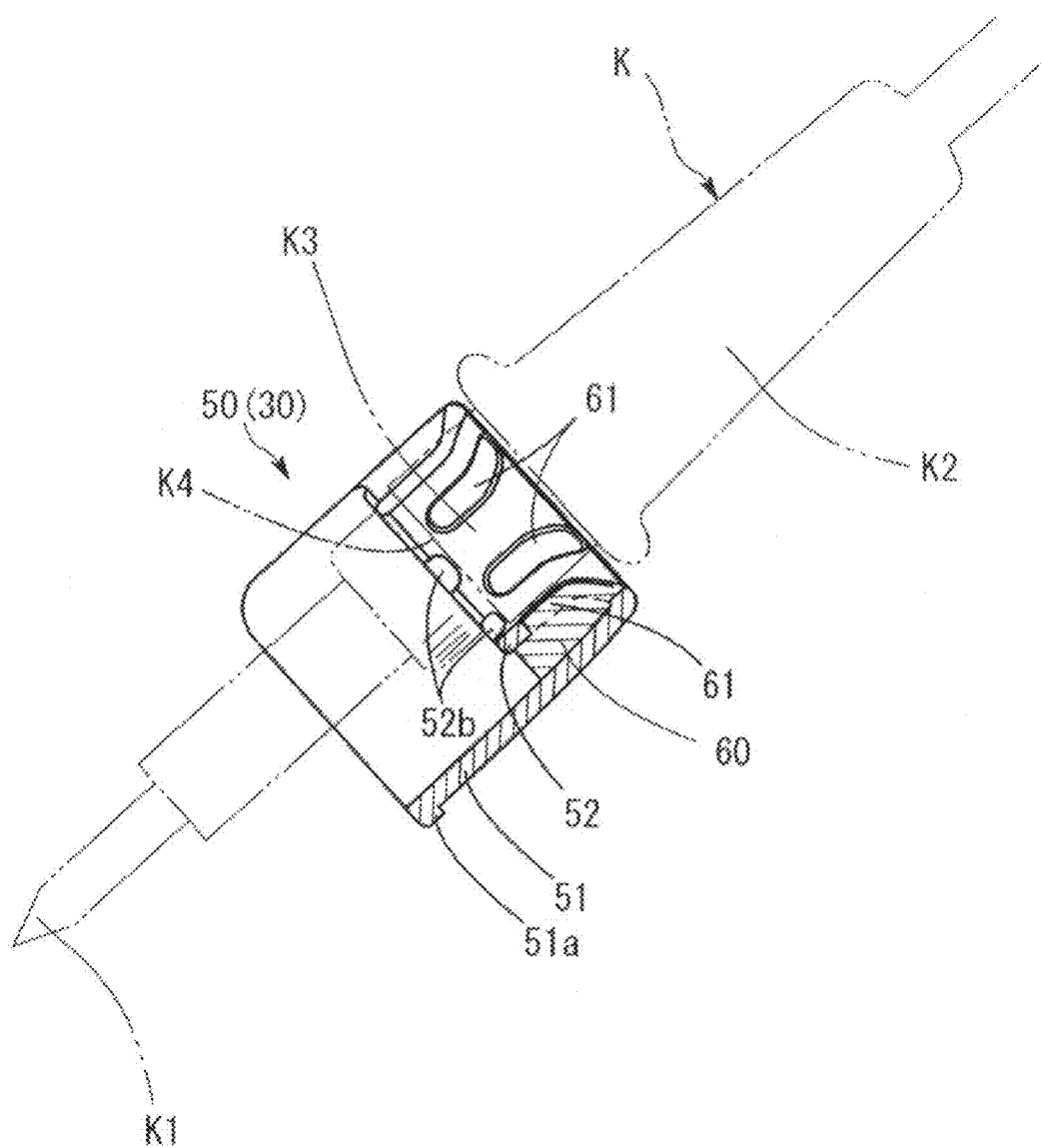
FIG. 9 is a sectional view of the soldering iron holder.

The slits 52a are one example of a plurality of recesses that may be implemented in some embodiments of the invention. Each of the slits 52a is formed to extend over the reversed taper portion on the side of the distal end. The inner sleeve 52 also has a plurality of protrusions 52b. The protrusions 52b are formed to protrude inwardly from a radially inside peripheral surface of the inner sleeve 52 and are arranged between respective adjacent ones of the slits 52a with even spaces in circumferential direction. As shown in FIG. 9, the protrusions 52b are adapted, when a plastic nipple portion K3 formed on the side of the soldering tip K1 relative to a grip portion K2 of the soldering iron K is in surface contact with the inner sleeve 52, to support the soldering iron K with a shoulder portion K4 formed on an edge of the nipple portion K3, so as to prevent the soldering iron K from falling.

Another feature of the soldering iron stand 1 in some embodiments of the invention is that a protective cap 60 serving as heat-resistant plastics is interposed between the outer and inner sleeves 51 and 52.

The protective cap 60 also serves as vibration dampening member that absorbs and/or dampens vibration of the outer and inner sleeves 51 and 52 arising from insertion and removal of the soldering iron K. In some embodiments, the protective cap 60 is compressed against the sleeves 51 and 52 to further enhance its sound absorbing and dampening function.

Figure 7A:
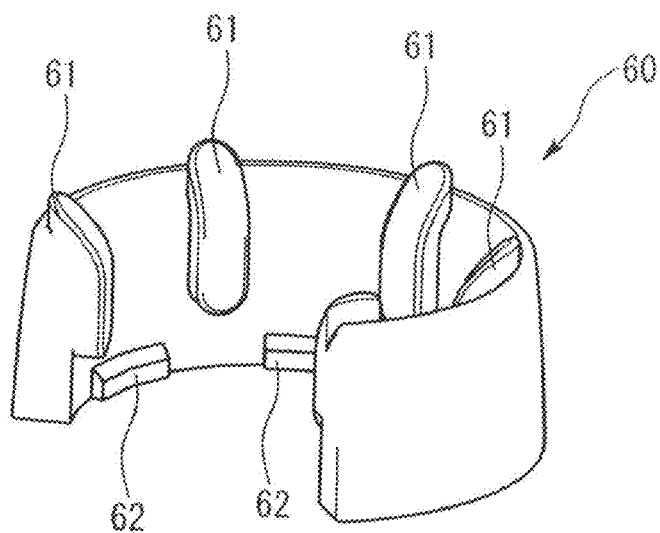
FIGS. 7A and 7B are perspective views showing a protective cap as an example of a heat-resistant plastics of the soldering iron holder.
Figure 7B:
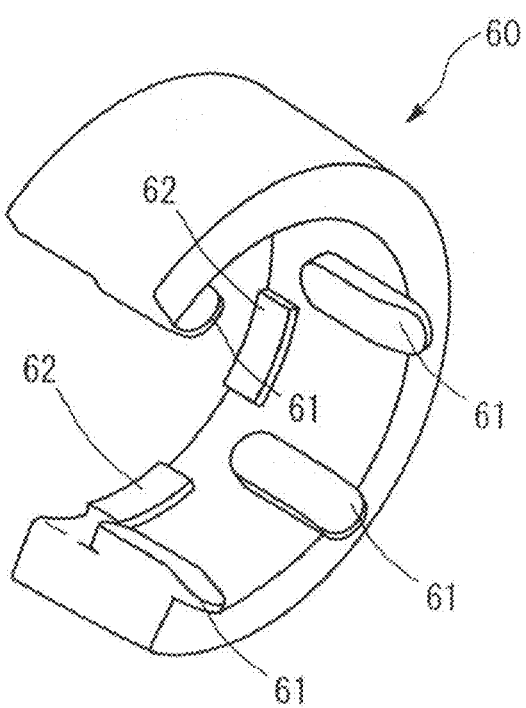

As shown in FIGS. 7A and 7B, the protective cap 60 is a member made of heat-resistant synthetic rubber, such as silicon rubber or Viton®, in its entirety, and formed in a C shape in top plan view to have dimensions capable of being press-fitted into a space between the outer and inner sleeves 51 and 52. The protective cap 60 has a plurality of first protrusions 61 integrally formed on a radially inside peripheral surface thereof and arranged in circumferentially and equally spaced-apart relation to each other.

Figure 8:
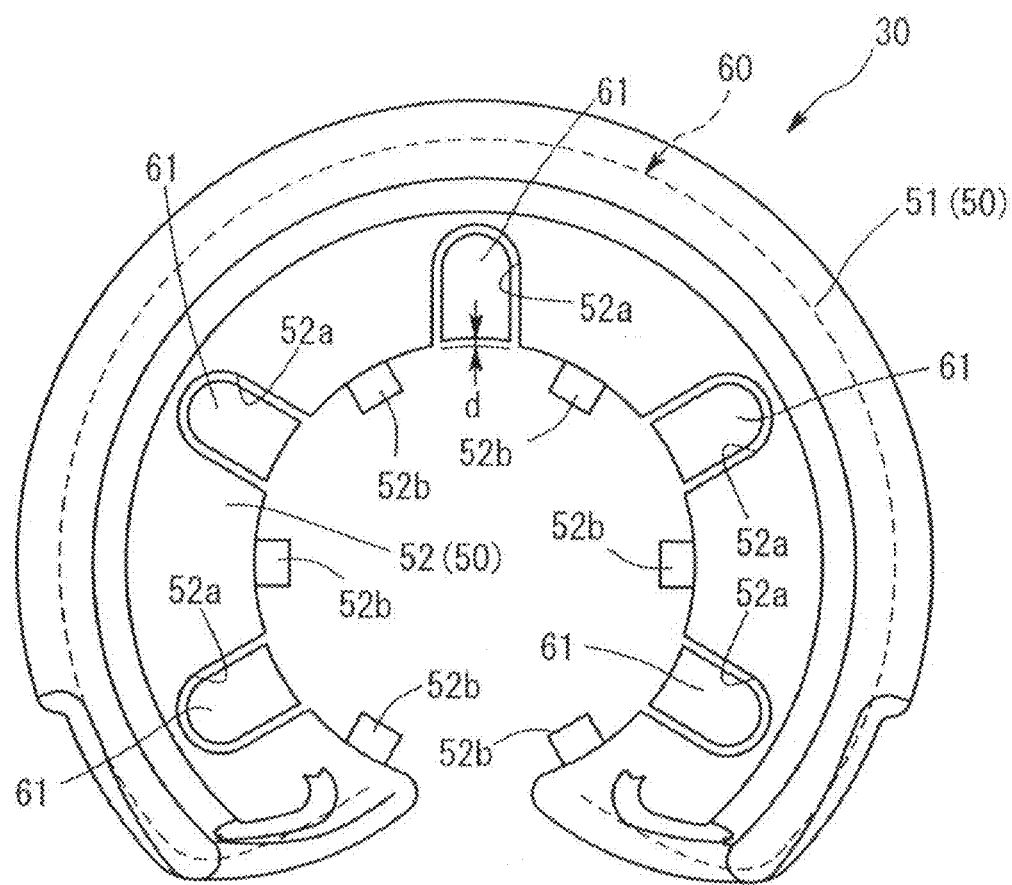
FIG. 8 is a top plan view of the soldering iron holder.

Each of the first protrusions 61 is formed to allow a distal end thereof to slightly protrude from a body of the protective cap 60, and have dimensions capable of being press-fitted into a respective one of the slits 52a formed in the inner sleeve 52, to extend over an overall length of the slit 52a. Further, each of the first protrusions 61 has a radially protruding height set such that a radial diameter becomes equal to that of the inner sleeve 52 (i.e., a top surface thereof becomes flush with the radially inside surface of the inner sleeve 52), or a slight recess space (see the gap d in FIG. 8) is defined above the top surface of the first protrusion 61 (i.e., the first protrusion 61 becomes slightly sunken relative to the radially inside surface of the inner sleeve 52), when the protective cap 60 is press-fitted into the space between the outer and inner sleeves 51 and 52. For example, the gap d in FIG. 8 is set in the range of 0 mm to 1 mm. This allows the soldering iron K to come into direct contact with the inner sleeve 52 during an operation of inserting the soldering iron K into the inner sleeve 52 of the soldering iron holder 30. Thus, heat of the grip portion K2 of the soldering iron will be more effectively transferred to the inner sleeve 52.

In some embodiments, the protective cap 60 also has a plurality of second protrusions 62 formed on a rear end region of the radially inside peripheral surface thereof and arranged between respective adjacent ones of the first protrusions 61 with even spaces in circumferential direction. Thus, in cooperation with the first protrusions 61, the second protrusions 62 provide support points arranged in a staggered pattern in the circumferential direction of the protective cap 60.

A process of a manual soldering task using the soldering iron stand 1 in accordance with this embodiment will be described.

In advance of the soldering task, the sponge 2 is put in the tray section 11 of the stand base 10, and water is supplied into the tray section 11 for the sponge 2 to be impregnated with the water. The residue receiver 20 is locked in the attaching position relative to the surrounding section 12 of the stand base 10. The thin strip-shaped metal wool 3 is stored in the metal wool container 25 of the residue receiver 20. The soldering iron holder 30 is attached onto the stand base 10. In operations of cleaning the soldering iron K, only either one of the sponge 2 and the thin strip-shaped metal wool 3 may be used.

An operator inserts the soldering tip K1 of the soldering iron K into the inner sleeve 52 of the soldering iron holder 30 to allow the soldering iron K to be held by the soldering iron stand 1. As shown in FIG. 9, in this state, the soldering iron K is held in such a manner that the nipple portion K3 is in surface contact with the peripheral wall (curved surface) of the inner sleeve 52, and the shoulder portion K3 is seated on the convex portions 52a of the inner sleeve 52. In the held state, a power switch of the soldering iron K is turned on to heat the heating portion of the soldering iron K.

After heating the soldering iron K, the soldering iron K is pulled out from the soldering iron holder 30, and used after wiping the soldering tip K1 with either one or both of the sponge 2 and the thin strip-shaped metal wool 3.

The soldering tip K1 may be additionally wiped with the scraping portion 41 provided on the lower edge of the cleaning window 14b to reliably scrape off solder residue attached on the soldering tip K1.

Subsequently, the soldering iron K is brought into contact with a soldering target to heat the target, and then a wire solder wound in the form of a reel is reeled out and fed to a joining area to perform soldering of a workpiece, on a preheated circuit board. Just after the soldering is fully completed, the soldering iron K is quickly moved away from the soldering workpiece. Then, the soldering iron K is re-inserted into the soldering iron holder 30, and held by the soldering iron stand 1.

Subsequently, the operator waits for natural cooling of the workpiece. During a waiting period (typically, about 3 to 5 seconds), the soldering tip K of the soldering iron K is positioned to extend obliquely downward while being oriented toward the collection compartment 26 of the residue receiver 20. Thus, solder residue remaining on the soldering tip K1 will directly drop into the collection compartment 26, even if the dropping occurs. In addition, when the residue receiver 20 is in the attaching position, the surrounding section 12 defines a substantially sealed space, except the opening 12a in the upper portion thereof. Therefore, even if solder residue on the soldering tip K1 is enlarged into a solder ball and the solder ball bursts in the space, there is not a risk that the solder residue scatters around the soldering iron stand 1.

Through repetition of the above operations, solder residue will be accumulated in the tray section and the metal wool container 25 of the soldering iron stand 1.

In maintenance operations for the soldering iron stand 1, solder residue accumulated in the tray section 11 is transferred to a given disposal location, for example, during replacement of the sponge 2.

Figure 4:
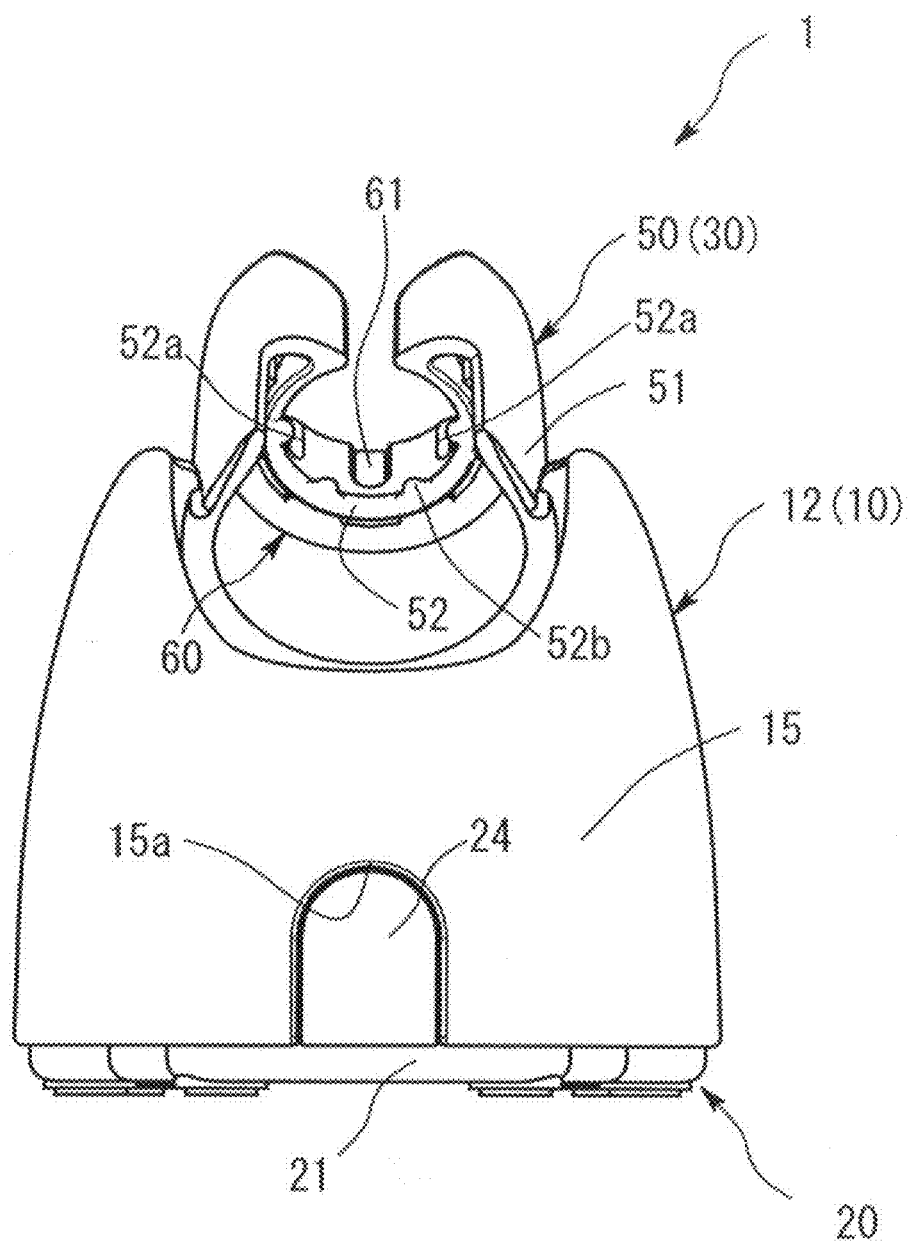
FIG. 4 is a back view of the soldering iron stand.

Further, for example, during replacement of the thin strip-shaped metal wool 3, the unlocking button 24 illustrated in FIG. 4 is pushed to be released the residue receiver 20 in a manner illustrated in FIGS. 5A and 5B, and then solder residue accumulated in the metal wool container 25 is transferred to a given disposal location.

Thus, the soldering iron stand 1 in accordance with this embodiment makes it possible to collect and discard solder residue on the soldering tip K1 in a maximally safe manner, during the use of the soldering iron and over the entire maintenance cycle for the soldering iron.

In the above described embodiment, the soldering iron K comes into slide contact with the inner sleeve 52 of the soldering iron holder 30 during the operations of inserting the soldering iron K into the soldering iron holder 30 to put the soldering iron K on the stand base 10. Vibration which would occur during the operation will be absorbed and/or dampened by the plurality of first protrusions 61 of the protective cap 60 interposed between the inner sleeve 52 and the outer sleeve 51. This prevents the occurrence of abnormal noise which would otherwise arise in a conventional soldering iron stand.

Heat in the grip portion K2 of the soldering iron K put on the stand base 10 is transferred through the nipple portion K3 from the inner sleeve 52 to the outer sleeve 51 and released into the atmosphere.

For some embodiments the protective cap 60 has the plurality of second protrusions 62, arranged between respective adjacent ones of the first protrusions 61 on the radially inside peripheral surface of the protective cap 60 with even spaces in circumferential direction. The second protrusions 62 are pressed against the radially outside peripheral surface of the inner sleeve 52. Thus, the second protrusions 62 and the first protrusions 61 are press-fitted in the slits 52a, are circumferentially arranged in a staggered pattern to form a support structure for the inner sleeve 52. This makes it possible to obtain more enhanced vibration absorbability or noise reduction effect, and strengthen a fixation structure.

For some embodiments the inner sleeve 52 is formed with the plurality of slits arranged in circumferentially spaced-apart relation to each other. Each of the plurality of first protrusions 61 are formed on the radially inside peripheral surface of the protective cap 60 and are press-fitted in a respective one of the slits 52a in such a manner as to be flush with the peripheral wall of the inner sleeve 52 or slightly sunken radially outwards relative to the peripheral wall. This allows the soldering iron K to come into direct contact with the inner sleeve 52 during the operation of inserting the soldering iron K into the sleeve body 50 of the soldering iron holder 30, thereby allowing thermal energy to be conducted to and dissipated by the sleeve body 50, so that the heat release effect can be enhanced. In addition, the first protrusions 61 are integrally molded together with the protective cap 60. This makes it possible to facilitate handling, and increase a contact area of the protective cap 60 with respect to the inner sleeve 52, based on the first protrusions 61 press-fitted in respective ones of the slits 52a, to improve the vibration absorbability and consequently obtain more enhanced noise reduction effect.

For some embodiments the soldering iron holder 30 is adapted to be detachably fixed to the stand base 10. This makes it possible to facilitate maintenance operations for the soldering iron holder 30 and the stand base 10.

For some embodiments, where the soldering iron K has the heated portion including the soldering tip K1, the stand base 10 includes: the surrounding section, adapted to surround the heated portion of the soldering iron K in a state of being inserted into the soldering iron holder 30; the residue receiver 20, provided at the bottom of the surrounding section 12, and adapted to receive solder residue which is likely to drop from the soldering tip K1 of the soldering iron K in the state of being inserted into the soldering iron holder 30; the attaching mechanism (the depression 11b, the rib 23), adapted to allow the residue receiver 20 to be attached to the surrounding section 12 in such a manner as to be displaceable between the attaching position where the residue receiver 20 is put to the surrounding section 12 to serve as the bottom of the surrounding section 12, and the releasing position where the residue receiver 20 is released from the surrounding section 12 so as to allow for disposal of the collected solder residue; and the unlocking button 24, adapted to be release the locked state of the residue receiver 20 by a push operation. Thus, in the above embodiment, the heated portion of the soldering iron K in the state of being inserted into the soldering iron holder 30 is surrounded by the surrounding section 12 of the stand base 10. This makes it possible to put the soldering iron K in the soldering iron stand 1 while ensuring operator's safety.

Solder residue is likely to drop from the soldering tip K1 of the soldering iron K. In this case, the solder residue is collected by the residue receiver 20 set in the attaching position. Further, the residue receiver 20 is adapted, based on the attaching mechanism (the depression 11b, the rib 23), to be displaceable between the attaching position where it is put to the surrounding section 12 to serve as the bottom of the surrounding section 12, and the releasing position where it is released from the surrounding section 12 so as to allow for disposal of the collected solder residue. Thus, the residue receiver 20 can be put to the surrounding section 12 to collect solder residue in the above manner, and is released from the surrounding section 12 to allow the collected solder residue to be readily discarded without being spilled on a work bench and a floor. A posture of the residue receiver 20 set in the attaching position is locked by the locking mechanism (the locking hook 24a, the locking projection 15b). Thus, during the use of the soldering iron of the soldering iron stand 1, the residue receiver 20 is kept from unduly opening the bottom of the surrounding section 12. Further, the locked state of the residue receiver 20 is released by pushing the unlocking button 24. This makes it possible to facilitate a maintenance operation.

For some embodiments the stand base 10 includes: the metal wool container 25 storing therein the thin strip-shaped metal wool 3 capable of clearing the soldering tip K1 of the soldering iron K; the cleaning window 14b allowing the strip-shaped metal wool 3 stored in the metal wool container 25 to be exposed therethrough; and the pad made of heat-resistant plastic materials and formed to have the scraping portion 41 extending along the lower edge of the cleaning window 14b. Thus, an operator can insert the soldering tip K1 of the soldering iron K into the metal wool container 25 through the cleaning window 14b to efficiently clean the soldering tip K1 using the strip-shaped metal wool 3 in the metal wool container 25. During this operation, the soldering tip K1 can be scraped by the scraping portion 41 provided along the lower edge of the cleaning window 14b to further efficiently scrape off solder residue on the soldering tip K1.

It other embodiments, in the releasing position, it is not essential that the residue receiver 20 is completely separated from the surrounding section 12, but the residue receiver 20 may be jointed to the surrounding section 12 by a hinge mechanism, or may be configured to be a drawer-like structure. However, a structure capable of physically separating the residue receiver 20 from the surrounding section 12 of the stand base, as shown in FIG. 5B, allows only the residue receiver 20 to be transported to a disposal location and subjected to disposal of solder residue, which provides an advantage of being able to improve efficiency of the disposal.

Figure 6A:
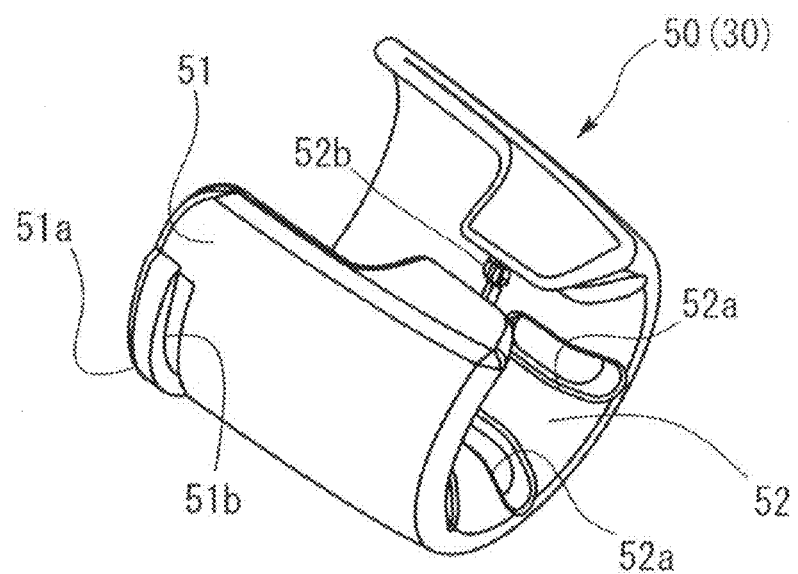
Figure 6B:
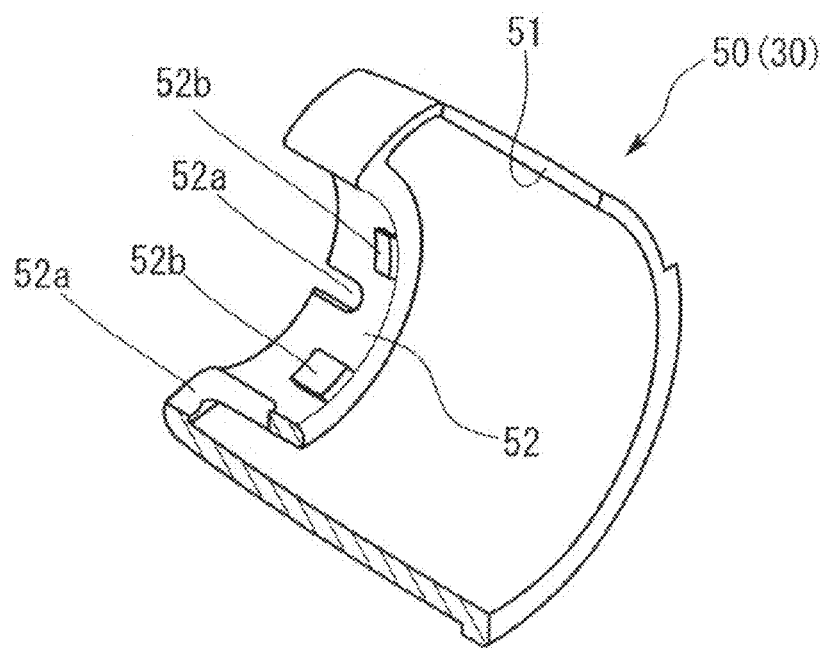

In other embodiments, in the sleeve body of the soldering iron holder 30, the outer sleeve 51 and the inner sleeve 52 may be formed as two separate members. However, the integrated combination of the outer and inner sleeves 51 and 52, as shown in FIGS. 6A and 6B, can have higher heat capacity, which is advantageous in terms of heat-conductivity. This also provides an advantage of being able to eliminate a need for an operation of assembling them.

In other embodiments, the soldering iron holder may comprise a single-layer sleeve body in which the outer sleeve and the inner sleeve are indistinguishable from each other. Furthermore, the first protrusions 61 serving as the elastic members are not limited to pieces integrated with the protective cap 60, but may be a plurality of heat-resistant rubber pieces located discretely in any direction and fitted into respective ones of the recesses.

Each of the recesses is not limited to the slit 52a. In other embodiments, in other embodiments the recesses are circular-shaped holes. Further, each of the recesses need not be a through-hole penetrating through the inner sleeve, but may be a bottomed (blind) hole.

Figure 10A:
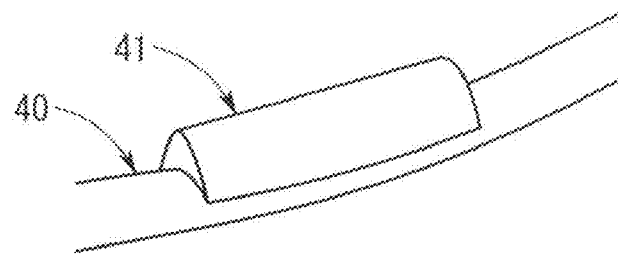
FIGS. 10A to 10D are schematic diagrams showing various examples of scraping portions applicable to a soldering iron stand of the present invention.
Figure 10B:
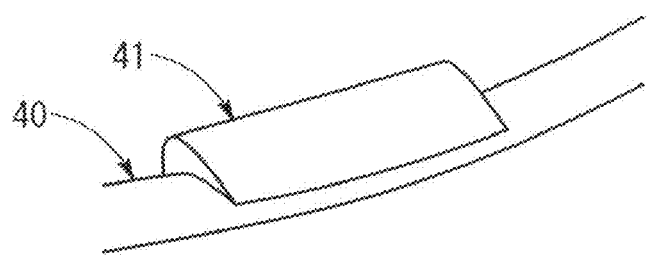
Figure 10C:
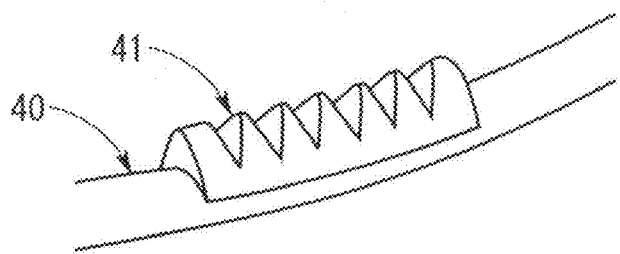
Figure 10D:
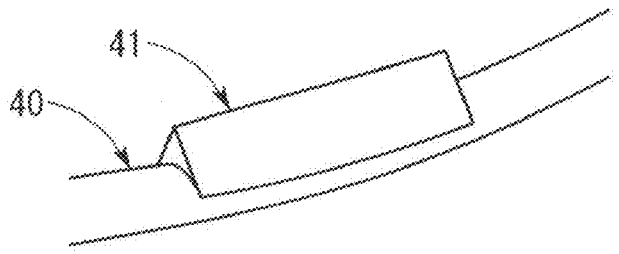

Referring to FIGS. 10A to 10D, a specific shape of the scraping portion 41 may be variously modified, for example, to a liner shape as shown in FIG. 10A, a sloped (curved) shape as shown in FIG. 10B, a wave shape (saw-tooth wave shape or sine wave shape) as shown in FIG. 10C, and a triangular sine wave shape, in cross-section, as shown in FIG. 10D. Typically, the scraping portion 41 or each of the first protrusions 61 may be a "rib" which means "any length of elongated elevation running on an object." In accordance with this definition, the scraping portion 41 or each of the first protrusions 61 includes various configurations, such as a protrusion, a projection, a convex portion and a raised portion. The scraping portion 41 is not limited to a linear-shaped portion, but may be a portion having a curved upper edge. Further, various design specifications required for the rib 23, the scraping portion 41 or each of the first protrusions 61, such as a shape, a size and a protruding or projecting level of the element (23, 41, 61), may be appropriately determined to achieve the aforementioned functions, intended purposes and effects.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A soldering iron stand comprising:
   a stand base; and
   a soldering iron holder on an upper portion of the stand base,
   in which the stand base includes:
      a surrounding section that partially encloses a collection compartment below a base end of the soldering iron holder, and
      a residue receiver moveable from an attaching position in which the residue receiver engages a rear wall of the surrounding section, to a releasing position in which the residue receiver is disengaged from the rear wall, such that when a soldering iron tip of a soldering iron is inserted through the soldering iron holder and into the collection compartment, the residue receiver while in the attaching position collects solder residue that drips from the soldering iron tip,
   wherein the soldering iron holder includes a curved surface configured to receive and support the soldering iron, the soldering iron holder having a plurality of recesses formed therein and arranged in a circumferential direction of the curved surface, each of the recesses being provided with a heat-resistant elastic member.

2. The soldering iron stand of claim 1, wherein the elastic members are press-fitted in a respective one of the recesses in such a manner as to be flush with the curved surface or slightly sunken radially outward relative to the curved surface.

3. The soldering iron stand of claim 1, wherein the soldering iron holder includes a metal sleeve body including an outer sleeve and an inner sleeve, the outer sleeve including a base end resting on the stand base, the inner sleeve disposed along and in concentric relation to the outer sleeve, the inner sleeve including a peripheral wall serving as the curved surface, the peripheral wall having a plurality of slits serving as the recesses.

4. The soldering iron stand of claim 3, further comprising a cap of heat-resistant plastic, the cap interposed between the inner sleeve and the outer sleeve, the cap including a plurality of first protrusions serving as the elastic members, each of the plurality of first protrusions integrally molded to the cap and press-fitted in a respective one of the slits in such a manner so as to be flush with the peripheral wall or slightly sunken radially outwards relative to the peripheral wall.

5. The soldering iron stand of claim 4, wherein the cap further includes a plurality of second protrusions on a radially inside peripheral surface of the cap, the second protrusions arranged circumferentially spaced-apart from each other and each of the second protrusions positioned between respective adjacent pairs of the first protrusions, the second protrusions pressed against a radially outside peripheral surface of the inner sleeve.

6. The soldering iron stand of claim 1, wherein the soldering iron holder further includes a groove configured to selectively engage on and detach from the stand base.

7. The soldering iron stand of claim 1, wherein the stand base further includes:
- a metal wool container storing therein a thin strip-shaped metal wool;
- a cleaning window exposing the thin strip-shaped metal wool; and
- a pad attached to a lower edge of the cleaning window, the pad made of a heat-resistant plastic material, the pad including a scraping portion that extends along the lower edge of the cleaning window.

8. A soldering iron stand comprising:
a stand base; and
a soldering iron holder on an upper portion of the stand base, the soldering iron holder configured to receive and support a soldering iron,
in which the stand base includes:
- a surrounding section that partially encloses a collection compartment below a base end of the soldering iron holder,
- a residue receiver moveable from an attaching position in which the residue receiver engages a rear wall of the surrounding section, to a releasing position in which the residue receiver is disengaged from the rear wall, such that when a soldering iron tip of the soldering iron is inserted through the soldering iron holder and into the collection compartment, the residue receiver while in the attaching position collects solder residue that drips from the soldering iron tip,
- an attaching mechanism configured to retain the residue receiver on the stand base when the residue receiver is in the attaching position, and
- a locking mechanism coupled to an unlocking button, the locking mechanism configured to lock the residue receiver in the attaching position and configured to unlock the residue receiver, with movement of the unlocking button, from the attaching position to allow movement of the residue receiver to the releasing position.

9. A soldering iron stand comprising:
a stand base; and
a soldering iron holder on the stand base, the soldering iron holder including a central passageway, an inner metal sleeve enclosing the central passageway, and a vibration dampening member of elastic material compressed against the inner metal sleeve,
wherein the stand base includes a surrounding section, a front wall, and a bottom plate, wherein the surrounding section, the front wall, and the bottom plate partially enclose a collection compartment within the stand base, and an upper portion of the surrounding section defines a heat-releasing opening above the collection compartment, and wherein the central passageway of the soldering iron holder provides access into the collection compartment.

10. The soldering iron stand of claim 9, wherein the soldering iron holder further includes an outer metal sleeve integrally formed with the inner metal sleeve, and the elastic material is compressed between the inner and outer metal sleeves.

11. The soldering iron stand of claim 10, wherein the vibration dampening member includes protrusions, and the inner metal sleeve includes recesses sized and shaped to receive the protrusions.

12. The soldering iron stand of claim 11, wherein the recesses are through-holes formed through the inner metal sleeve, and the protrusions extend into the through-holes and are flush or sunken below a curved surface of the inner metal sleeve that faces the central passageway.

13. The soldering iron stand of claim 9, wherein the bottom plate is part of a residue receiver that is movable from an attaching position in which the residue receiver contacts a rear wall of the surrounding section, to a releasing position in which the residue receiver is spaced apart from the rear wall.

14. The soldering iron stand of claim 9, wherein the front wall includes an opening having a lower edge covered by a scraping portion of heat-resistant plastic.

* * * * *